Oct. 23, 1945.　　　M. M. CUNNINGHAM　　　2,387,316
FUEL SUPPLY SYSTEM
Filed Feb. 27, 1943　　　2 Sheets-Sheet 1
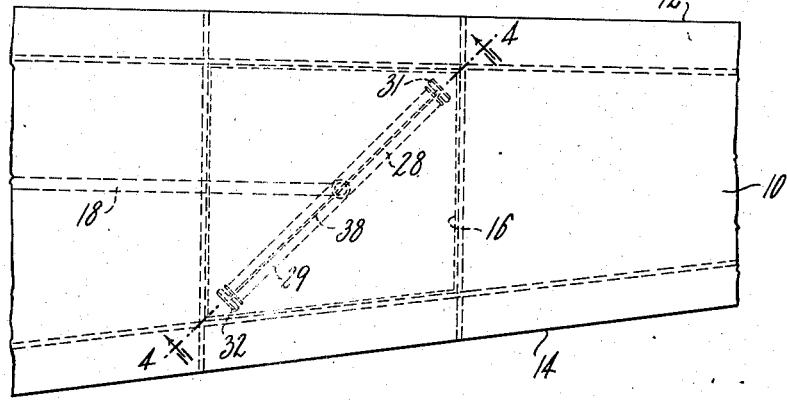
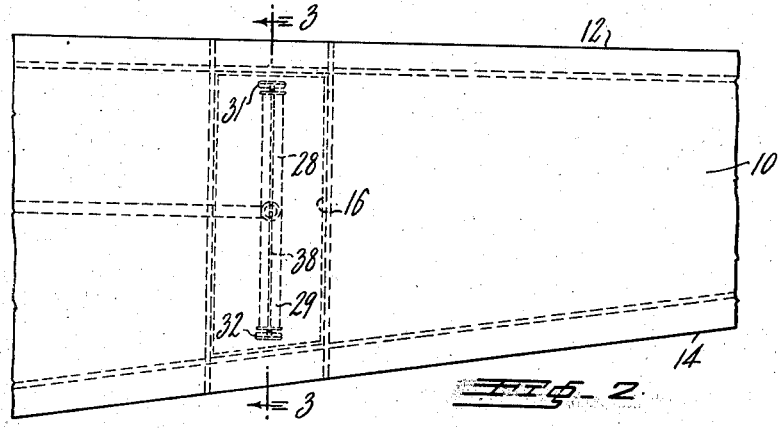
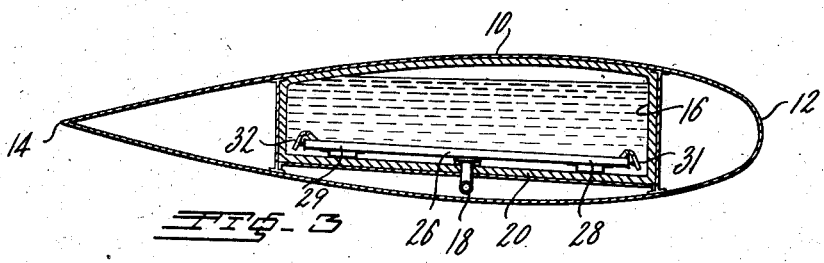
INVENTOR.
MARION M. CUNNINGHAM
BY
ATTORNEY Oct. 23, 1945.    M. M. CUNNINGHAM    2,387,316
FUEL SUPPLY SYSTEM
Filed Feb. 27, 1943    2 Sheets-Sheet 2
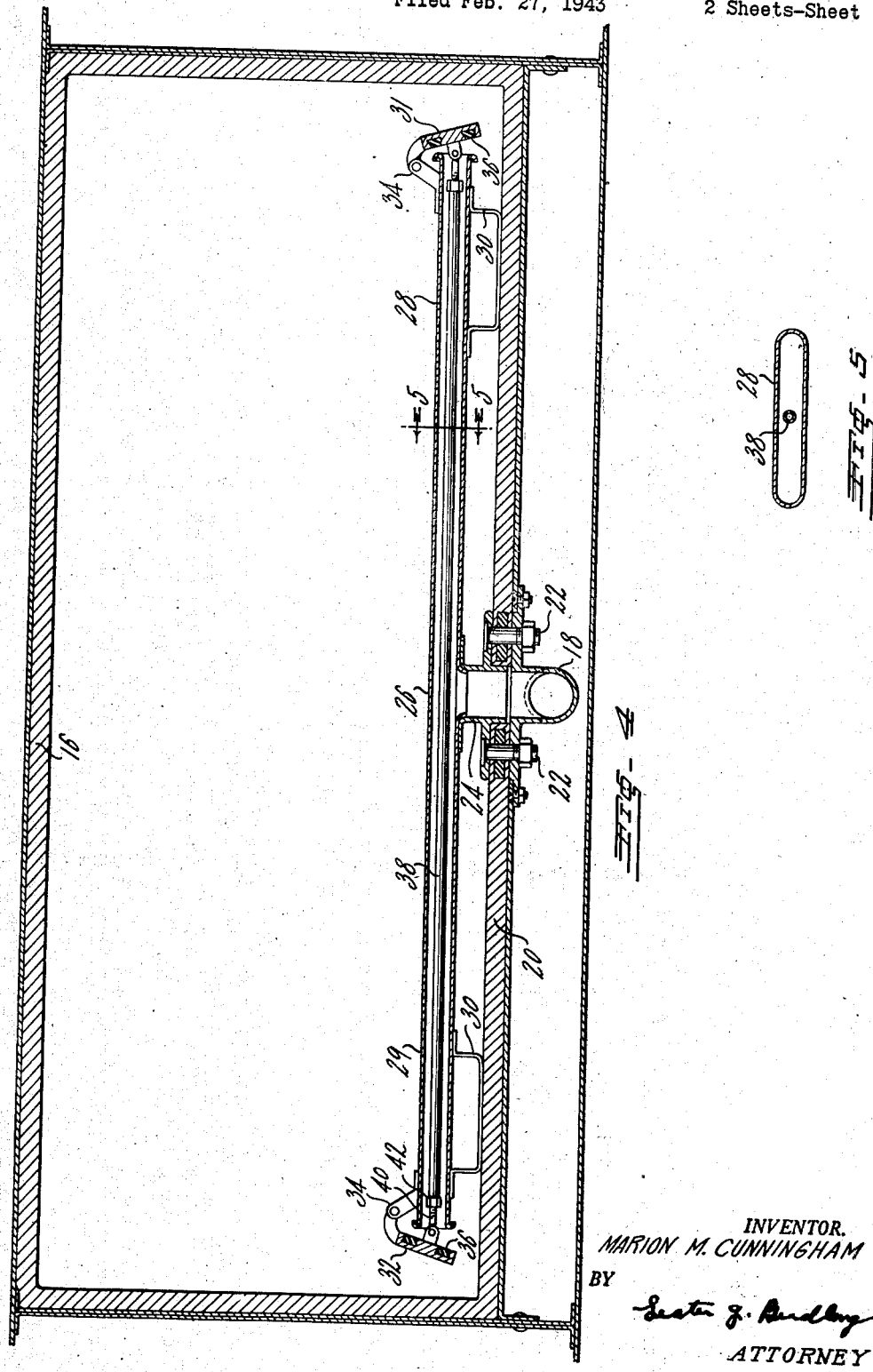
INVENTOR.
MARION M. CUNNINGHAM
BY
ATTORNEY Patented Oct. 23, 1945

2,387,316

UNITED STATES PATENT OFFICE 2,387,316

FUEL SUPPLY SYSTEM

Marion M. Cunningham, South Bend, Ind., assignor to United States Rubber Company, New York, N. Y., a corporation of New Jersey Application February 27, 1943, Serial No. 477,459

1 Claim. (Cl. 277—21)

This invention relates to devices for withdrawing liquid from containers and is especially adapted to fuel supply system for airplanes.

Fuel tanks in airplanes are frequently placed in the wings. This requires a relatively wide, shallow tank. When such a tank is only partly full and the plane is tilted in flight, the entire fuel supply may collect at one side of the tank and thus may run away from the inlet of the pipe which conducts the fuel to the engine. This may stop the engine under conditions which make it impossible to start again in time to avert a crash. Therefore, it is important to provide means for insuring a continuous supply of fuel to the inlet of the fuel pipe regardless of the angle and direction of tilt of the plane.

It has been proposed to provide a tank having a number of outlets, one disposed at the front of the tank and the other at the rear of the tank in order to drain fuel from the tank under conditions of dive and climb respectively. Such proposals have the disadvantage that although one inlet may be submerged, the other inlet may draw in air and stop the motor unless a Y-connection is arranged to have sufficient vertical height that the liquid always covers the throat of the Y and thus seals the branch of the conduit leading from the uppermost inlet. Such arrangements have been proposed but they require such a great vertical height that they are not practical for use in wings. Furthermore, such arrangements will not assure uninterrupted supply of fuel when the fuel flows to the outboard end of the tank when the plane is in a side slip or in a flat turn or skid.

Various arrangements of stand pipes of varying small horizontal cross-sections, and various arrangements of check valves have been proposed, but these which have come to my attention are inadequate to take care of all conditions encountered in flight. The standpipes which are of sufficiently small horizontal dimension to be effective are necessarily of too limited capacity to provide for long climbs. The proposed arrangements of valves are sluggish and unreliable and none of them provide for all conditions of tilting of the plane in operation.

My invention eliminates these disadvantages and provides a simple, reliable fuel supply system which assures an uninterrupted flow of fuel from the tank to the engine under all conditions of climb, dive and side slip, and prevents the induction of air into the fuel conduit.

In the drawings:

Fig. 1 is a plan view of a portion of an airplane wing showing the arrangement in a fuel tank of a fuel supply device embodying my invention;

Fig. 2 shows an alternative arrangement;

Fig. 3 is a vertical longitudinal section on the line 3—3 of Fig. 2;

Fig. 4 is an enlarged longitudinal section through the fuel supply device on the line 4—4 of Fig. 1; and Fig. 5 is a section on the line 5—5 of Fig. 4.

Referring to the drawings, 10 designates an airplane wing having a leading or forward edge 12 and trailing or rear edge 14. Suitably mounted within the wing is a fuel tank diagrammatically represented by the broken line 16, the tank extending substantial distances both in the direction of the axis of the fuselage or line of flight AB of the plane and across the span or in a direction transverse to the axis of the fuselage. A fuel supply pipe 18 is connected to the bottom of the tank substantially at the center.

Referring to Figs. 2 and 4 the fuel supply conduit 18, which may have any desired number of branches, is connected to the bottom wall 20 of the tank by any suitable means such as the bolts 22. Also secured to the tank by the bolts 22 is an outlet 24 which registers with the conduit 18. Connected to the outlet 24 is a rigid pipe 26 preferably of flat cross-section, extending in opposite directions and forming a pair of selector conduits 28 and 29. The pipe 26 is disposed parallel to the bottom wall 20 of the tank and may if desired be supported adjacent the bottom of any suitable supports 30. Preferably the pipe 26 is supported slightly above the bottom in order to prevent water of condensation from flowing into the fuel pipe 18. The open ends of the conduits 28 and 29 are provided with valves 31 and 32, respectively, pivoted to supports 34 disposed above the pipe 26. Each valve has a suitable gasket 36 for sealing the end of the conduit and the valves are arranged to drop by gravity to close the higher end of the pipe 26, when the pipe is not horizontal. A tie-rod or push-rod 38 is pivotally connected to each valve and may pass through the pipe 26. The length of the push-rod can be adjusted by threaded sections 40 and lock nuts 42 or in any suitable manner to regulate the degree of valve opening.

The length of the push-rod is adjusted so that when the pipe 26 is horizontal, the rod holds both valves 31 and 32 open as shown in Fig. 2. The purpose of this arrangement is to prevent both valves dropping shut when the pipe is horizontal. If they did, both selector conduits would be closed and shut off the supply of fuel. Whenever the pipe 26 is tilted the uppermost valve drops closed and the lowermost valve drops farther open. This permits fuel to be drawn in through the lower end of the pipe 26 and seals the upper end to prevent the induction of air.

As shown in Fig. 1, the pipe 26 is arranged diagonally of the tank so that one end, for example the end carrying the valve 32 is located both at the leading or forward side and at the outboard side of the tank 16 while the other end of the pipe, controlled by the valve 31, is located at the trailing or rear edge of the tank and at the inboard side of the tank. The bottom wall 20 of the tank and the pipe 26 are normally substantially horizontal when the plane is in level flight. It is customary to provide a slight dihedral angle between the wings of the plane, which may amount to approximately 6 degrees, in which case the bottom wall 20 of the tank may be inclined at an angle of 6° but this position is included within the term substantially horizontal as used herein.

It will be observed that when the plane is in straight level flight both valves 32 and 31 will be open and fuel can be drawn in through both selector conduits 28 and 29. If the plane climbs, fuel collects in the rear portion of the tank and the weight of the two valves combined with the weight of the push-rod closes the valve 32 to prevent the induction of air through the exposed selector conduit 28 and permit induction of gasoline through open valve 31 and conduit 29. The diagonal angle of the pipe 26 is such that the valve 32 will close and valve 31 open when the plane climbs and valve 32 will be open and valve 31 closed when the plane dives or side slips. Under some conditions of turn in which the plane is not banked, fuel will flow by centrifugal action to the outboard side of the tank. In such cases the centrifugal force due to the spin of the plane will throw the rod 38 outward, closing the valve 31 and holding the valve 32 open for the induction of fuel.

The invention is also of advantage when applied to tanks of narrow span dimension as illustrated in Fig. 2. In this arrangement the pipe 26 is parallel to the axis of the fuselage. Otherwise the construction of the conduits and valves is as described in connection with Fig. 4 and its arrangement in the tank is the same, one selector conduit having its inlet at the forward side of the tank while the other selector conduit has its inlet at the trailing or rear side of the tank. This arrangement adequately takes care of conditions of climb and dive and is satisfactory where it is not necessary to provide against side slip conditions.

Although some of the advantages of the invention may be derived from connecting the valve 31 and 32 through any suitable arrangement which prevents both valves being closed at the same time it is advantageous to connect the valve by a heavy and substantially rigid push-rod as indicated. This rod has no drag, or horizontal component of force tending to close both valves when the pipe 26 is horizontal. The weight of the rod materially assists in closing the appropriate valve whenever the pipe 26 is tilted slightly. The weight of the column of liquid confined in the pipe 26 is added to the weight of the push-rod and assists in quickly closing the uppermost valve when the plane tilts. This arrangement provides a sensitive and reliable mechanism for operating the valves.

Having thus described my invention, what I claim and desire to protect by Letters Patent is:

A device for withdrawing liquid from a container comprising in combination a conduit open at its ends, a valve for controlling each end of the conduit, a pivot supporting each valve at a point above the conduit whereby the valve tends to drop by gravity to closed position when the conduit is horizontal, a push rod having each of its ends pivoted to one of said valves below the supporting pivot of the valve, said valves constituting the sole supporting means for said push rod, the rod passing freely through the conduit between the valves, and an eduction conduit connected to the first-mentioned conduit at a point between the valves.

MARION M. CUNNINGHAM.